United States Patent
Ahn et al.

(10) Patent No.: US 8,987,379 B2
(45) Date of Patent: Mar. 24, 2015

(54) POLYCARBONATE RESIN COMPOSITION HAVING EXCELLENT CHEMICAL RESISTANCE

(71) Applicant: Cheil Industries Inc., Gumi-si (KR)

(72) Inventors: Gi Ho Ahn, Uiwang-si (KR); Tae Uk Kim, Uiwang-si (KR); Jung Ki Kim, Uiwang-si (KR)

(73) Assignee: Cheil Industries Inc., Gumi-si (KR)

(*) Notice: Subject to any disclaimer, the term of this patent is extended or adjusted under 35 U.S.C. 154(b) by 0 days.

(21) Appl. No.: 13/931,952

(22) Filed: Jun. 30, 2013

(65) Prior Publication Data

US 2013/0289193 A1    Oct. 31, 2013

Related U.S. Application Data

(63) Continuation-in-part of application No. PCT/KR2011/008930, filed on Nov. 22, 2011.

(30) Foreign Application Priority Data

Dec. 30, 2010   (KR) .................. 10-2010-0138606

(51) Int. Cl.
| | | |
|---|---|---|
| C08L 83/06 | (2006.01) | |
| C08L 83/10 | (2006.01) | |
| C08L 69/00 | (2006.01) | |
| C08G 64/18 | (2006.01) | |
| C08L 25/06 | (2006.01) | |

(52) U.S. Cl.
CPC ............... C08L 83/10 (2013.01); C08L 69/00 (2013.01); *C08G 64/186* (2013.01); *C08L 25/06* (2013.01)
USPC ..................... 525/101; 525/106; 525/464

(58) Field of Classification Search
USPC ........................... 525/101, 106, 464
See application file for complete search history.

(56) References Cited

U.S. PATENT DOCUMENTS

| | | |
|---|---|---|
| 3,189,662 A | 6/1965 | Vaughn, Jr. |
| 3,686,355 A | 8/1972 | Gaines et al. |
| 4,027,073 A | 5/1977 | Clark |
| 4,045,514 A | 8/1977 | Iwahashi et al. |
| 4,263,416 A | 4/1981 | Liu et al. |
| 4,287,315 A | 9/1981 | Meyer et al. |
| 4,289,859 A | 9/1981 | Kalinowski et al. |
| 4,400,333 A | 8/1983 | Neefe |
| 4,554,302 A | 11/1985 | Miller |
| 4,745,029 A | 5/1988 | Kambour |
| 4,906,696 A | 3/1990 | Fischer et al. |
| 5,061,558 A | 10/1991 | Fischer et al. |
| 5,200,492 A | 4/1993 | Ohnaga et al. |
| 5,243,009 A | 9/1993 | Rich et al. |
| 5,280,070 A | 1/1994 | Drzewinski et al. |
| 5,284,916 A | 2/1994 | Drzewinski |
| 5,292,809 A | 3/1994 | Drzewinski et al. |
| 5,449,557 A | 9/1995 | Liebler et al. |
| 5,451,632 A * | 9/1995 | Okumura et al. ............. 524/537 |
| 5,473,019 A | 12/1995 | Siol et al. |
| 5,530,083 A | 6/1996 | Phelps et al. |
| 6,001,929 A | 12/1999 | Nodera et al. |
| 6,010,974 A | 1/2000 | Kim et al. |
| 6,072,016 A | 6/2000 | Kobayashi et al. |
| 6,252,002 B1 | 6/2001 | Yamada et al. |
| 6,284,700 B1 | 9/2001 | Lyu et al. |
| 6,576,706 B1 | 6/2003 | Nodera et al. |
| 6,646,068 B2 | 11/2003 | Chisholm et al. |
| 6,657,018 B1 | 12/2003 | Hoover |
| 6,790,887 B1 | 9/2004 | Nishihara |
| 7,067,188 B1 | 6/2006 | Yang et al. |
| 7,294,659 B2 | 11/2007 | Yatake |
| 7,365,125 B2 | 4/2008 | Govaerts et al. |
| 7,553,895 B2 | 6/2009 | An et al. |
| 7,732,515 B2 | 6/2010 | Jang et al. |
| 8,410,238 B2 * | 4/2013 | Ko et al. .......................... 528/31 |

(Continued)

FOREIGN PATENT DOCUMENTS

| | | |
|---|---|---|
| CN | 101434749 A | 5/2009 |
| CN | 101735586 A | 6/2010 |

(Continued)

OTHER PUBLICATIONS

International Search Report in counterpart International Application No. PCT/KR2011/008930 dated Jun. 29, 2012, pp. 1-6.
European Search Report in commonly owned European Application No. 09180634 dated Feb. 2, 2010, pp. 1-3.
Xu, "Predicition of Refractive Indices of Linear Polymers by a four-descriptor QSPR model", Polymer, 45 (2004) pp. 8651-8659.
Office Action in commonly owned U.S. Appl. No. 12/642,904 mailed Dec. 14, 2011, pp. 1-9.

(Continued)

*Primary Examiner* — Margaret Moore
(74) *Attorney, Agent, or Firm* — Additon, Higgins & Pendleton, P.A.

(57) ABSTRACT

A polycarbonate resin composition includes: (A) an aromatic polycarbonate in an amount of about 5 to about 95% by weight, (B) a siloxane-based polycarbonate in an amount of about 5 to about 90% by weight, and (C) a syndiotactic polystyrene in an amount of 0 to about 5% by weight. The polycarbonate resin composition can have excellent flowability, injection moldability, impact strength, chemical resistance, and transparency.

In a preferred embodiment the siloxane-based polycarbonate comprises a compound represented by the following formula in the main chain thereof:

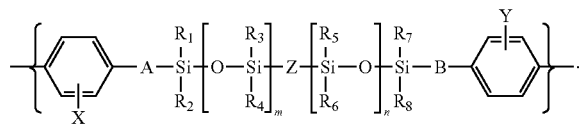

18 Claims, No Drawings

(56) References Cited

U.S. PATENT DOCUMENTS

| | | |
|---|---|---|
| 2002/0042483 A1 | 4/2002 | Vanderbilt |
| 2003/0065071 A1 | 4/2003 | Scholten |
| 2005/0101757 A1 | 5/2005 | Glasgow et al. |
| 2005/0256246 A1 | 11/2005 | Van Hartingsveldt et al. |
| 2006/0004154 A1 | 1/2006 | DeRudder et al. |
| 2006/0030647 A1 | 2/2006 | Ebeling et al. |
| 2006/0047037 A1 | 3/2006 | Kawato et al. |
| 2006/0074156 A1 | 4/2006 | Ebeling et al. |
| 2007/0105994 A1 | 5/2007 | Li et al. |
| 2007/0213452 A1 | 9/2007 | Kawato et al. |
| 2007/0293608 A1 | 12/2007 | Chen et al. |
| 2008/0015291 A1 | 1/2008 | Siripurapu et al. |
| 2008/0029744 A1 | 2/2008 | Jansen et al. |
| 2008/0227896 A9 | 9/2008 | Ebeling et al. |
| 2009/0023871 A9 | 1/2009 | Fujiguchi et al. |
| 2009/0069489 A1 | 3/2009 | Vollenberg et al. |
| 2009/0080079 A1 | 3/2009 | Kogure et al. |
| 2009/0118402 A1 | 5/2009 | Jang et al. |
| 2009/0318629 A1 | 12/2009 | Adoni et al. |
| 2010/0029855 A1 | 2/2010 | Matsuoka et al. |
| 2010/0113697 A1 | 5/2010 | Lee et al. |
| 2010/0152357 A1 | 6/2010 | Kwon et al. |
| 2010/0168272 A1 | 7/2010 | Park et al. |
| 2010/0240831 A1 | 9/2010 | Kim et al. |
| 2010/0256288 A1 | 10/2010 | Kim et al. |
| 2011/0009524 A1 | 1/2011 | Kwon et al. |
| 2011/0021677 A1 | 1/2011 | Kwon et al. |
| 2011/0040019 A1 | 2/2011 | Kwon et al. |
| 2011/0160380 A1 | 6/2011 | Kwon et al. |
| 2012/0129993 A1 | 5/2012 | Ha et al. |
| 2013/0137801 A1 | 5/2013 | Ha et al. |

FOREIGN PATENT DOCUMENTS

| | | |
|---|---|---|
| EP | 1010725 A2 | 6/2000 |
| EP | 1533340 A1 | 5/2005 |
| EP | 1555296 A1 | 7/2005 |
| EP | 2204412 A1 | 7/2010 |
| GB | 2057464 A | 4/1981 |
| JP | 04-023856 A | 1/1992 |
| JP | 04-359954 A | 12/1992 |
| JP | 06-313089 A | 11/1994 |
| JP | 2000-086844 A | 3/2000 |
| JP | 2001-049072 A | 2/2001 |
| JP | 2002-080676 | 3/2002 |
| JP | 2005-247999 A | 9/2005 |
| JP | 2006-131833 | 5/2006 |
| JP | 2006-249288 A | 9/2006 |
| JP | 2006-249292 A | 9/2006 |
| JP | 2006-257126 | 9/2006 |
| JP | 2006-257284 A | 9/2006 |
| JP | 2006-342246 A | 12/2006 |
| JP | 2009-040876 A | 2/2009 |
| JP | 2010-202825 A | 9/2010 |
| KR | 10-2000-0048033 A | 7/2000 |
| KR | 2004-79118 A | 9/2004 |
| KR | 10-2006-0050497 A | 5/2006 |
| KR | 10-0767428 B1 | 10/2007 |
| KR | 10-2009-0018827 A | 2/2009 |
| KR | 10-2009-0020648 A | 2/2009 |
| KR | 10-2009-0026339 | 3/2009 |
| KR | 10-2009-0035031 A | 4/2009 |
| KR | 10-2009-0066204 | 6/2009 |
| KR | 10-2009-0066204 A | 6/2009 |
| KR | 10-2010-0049458 A | 5/2010 |
| WO | 00/46299 A1 | 8/2000 |
| WO | 2007/119920 A1 | 10/2007 |
| WO | 2007/140101 A1 | 12/2007 |
| WO | 2008/081791 A1 | 7/2008 |
| WO | 2009/051373 A2 | 4/2009 |
| WO | 2009/078593 A1 | 6/2009 |
| WO | 2009/078602 A1 | 6/2009 |
| WO | 2009/113762 A2 | 9/2009 |
| WO | 2009/116722 A1 | 9/2009 |
| WO | 2009/128601 A1 | 10/2009 |
| WO | 2012/015109 A1 | 2/2012 |
| WO | 2012/091293 A2 | 7/2012 |

OTHER PUBLICATIONS

Chinese Office Action in commonly owned Chinese Application No. 200910211954 dated Jun. 23, 2011, pp. 1-5.
English translation of Chinese Office Action in commonly owned Chinese Application No. 200910211954 dated Jun. 23, 2011, pp. 1-5.
Katrizky et al., "Correlation and Prediction of the Refractive Indices of Polymers by QSPR", Journal of Chemical Information and Computer Sciences, pp. 1171-1176, (1998).
Office Action in commonly owned U.S. Appl. No. 12/631,018 mailed Nov. 8, 2011, pp. 1-10.
European Search Report in commonly owned European Application No. 10196806 dated Apr. 27, 2011, pp. 1-5.
International Search Report in commonly owned International Application No. PCT/KR2010/008651 dated Aug. 25, 2011, pp. 1-2.
European Search Report in commonly owned European Application No. 08862371 dated Dec. 7, 2010, pp. 1-6.
Japanese Office Action in commonly owned Japanese Application No. 2010-539284, dated Sep. 11, 2012, pp. 1-3.
International Search Report in commonly owned International Application No. PCT/KR2008/006870, dated May 28, 2009, pp. 1-2.
Korean Office Action in commonly owned Korean Application No. 10-2010-0074229 dated Mar. 16, 2013, pp. 1-4.
Office Action in commonly owned U.S. Appl. No. 12/980,718 mailed Jul. 17, 2013, pp. 1-8.
Office Action in commonly owned U.S. Appl. No. 12/980,718 mailed Dec. 18, 2012, pp. 1-6.
Office Action in commonly owned U.S. Appl. No. 12/980,718 mailed Mar. 25, 2013, pp. 1-11.
Notice of Allowance in commonly owned U.S. Appl. No. 12/980,718 mailed Aug. 4, 2014, pp. 1-8.
International Search Report in commonly owned International Application No. PCT/KR2008/007157, dated May 28, 2009, pp. 1-2.
Office Action in commonly owned U.S. Appl. No. 12/792,176 mailed Nov. 16, 2011, pp. 1-12.
International Search Report in commonly owned International Application No. PCT/KR2008/007825, dated Aug. 28, 2009, pp. 1-2.
Office Action in commonly owned U.S. Appl. No. 12/880,209 mailed Feb. 16, 2011, pp. 1-10.
Final Office Action in commonly owned U.S. Appl. No. 12/880,209 mailed Jul. 29, 2011, pp. 1-9.
Advisory Action in commonly owned U.S. Appl. No. 12/880,209 mailed Nov. 4, 2011, pp. 1-4.
International Search Report in commonly owned International Application No. PCT/KR2008/007820 dated Jul. 28, 2009, pp. 1-2.
Final Office Action in commonly owned U.S. Appl. No. 12/642,904 mailed Mar. 27, 2012, pp. 1-7.
Notice of Allowance in commonly owned U.S. Appl. No. 12/642,904 mailed Jul. 2, 2012, pp. 1-8.
European Search Report in commonly owned European Application No. 08873425.6 dated May 29, 2012, pp. 1-5.
Office Action in commonly owned U.S. Appl. No. 12/884,549 mailed Aug. 21, 2012, pp. 1-12.
Final Office Action in commonly owned U.S. Appl. No. 12/792,176 mailed Apr. 19, 2012, pp. 1-10.
Advisory Action in commonly owned U.S. Appl. No. 12/792,176 mailed Aug. 23, 2012, pp. 1-4.
Final Office Action in commonly owned U.S. Appl. No. 12/631,018 mailed Apr. 26, 2012, pp. 1-12.
Mark, Physical Properties of Polymers Handbook, 2nd Edition, Polymer Research Center and Department of Chemistry, University of Cincinnati, OH, (2007) Springer, pp. 5-7.
Polysciences, Inc., data sheet for benzyl acrylate, no date, pp. 1-2.
Guidechem, data sheet for RUBA-93, no date, pp. 1-2.
European Search Report and Written Opinion in commonly owned European Application No. 11186686.9 dated Mar. 6, 2012, pp. 1-5.
Office Action in commonly owned U.S. Appl. No. 12/980,718 mailed Oct. 28, 2013, pp. 1-10.
Chinese Office Action in commonly owned Chinese Application No. 201110314363.9, dated Nov. 5, 2013, pp. 1-9.

(56) References Cited

OTHER PUBLICATIONS

English translation of Chinese Office Action in commonly owned Chinese Application No. 201110314363.9, dated Nov. 5, 2013, pp. 1-8.
Office Action in commonly owned U.S. Appl. No. 13/752,707 mailed Jul. 23, 2014, pp. 1-8.
Office Action in commonly owned U.S. Appl. No. 13/269,653 mailed Dec. 9, 2013, pp. 1-10.

Notice of Allowance in commonly owned U.S. Appl. No. 13/269,653 mailed May 7, 2014, pp. 1-7.

* cited by examiner

POLYCARBONATE RESIN COMPOSITION HAVING EXCELLENT CHEMICAL RESISTANCE

CROSS-REFERENCE TO RELATED APPLICATIONS

This application is a continuation-in-part of International Application No. No. PCT/KR2011/008930, filed Nov. 22, 2011, pending, which designates the U.S., published as WO2012/091293, and is incorporated herein by reference in its entirety, and claims priority therefrom under 35 USC Section 120. This application also claims priority under 35 USC Section 119 to and the benefit of Korean Patent Application No. 10-2010-0138606, filed Dec. 30, 2010, the entire disclosure of which is incorporated herein by reference.

FIELD OF THE INVENTION

The present invention relates to a polycarbonate resin that can have excellent chemical resistance.

BACKGROUND OF THE INVENTION

Polycarbonate resin is a polymeric material which is widely used as an exterior material for portable electronic devices such as mobile phones due to its excellent transparency and impact strength.

However, if a polycarbonate resin is used as an exterior material for portable electronic devices, typically a painting process is required to express a variety of colors. The polycarbonate resin can be exposed to the diluents solution of the paint during the painting process. The diluents solution can penetrate into the polycarbonate resin, which can reduce mechanical properties and impact strength of the polycarbonate resin.

Methods used to address these problems include blending the polycarbonate resin with ester-based polymers, blending the polycarbonate resin with sulfone-based polymers, and adding a rubber-based impact reinforcing agent to the polycarbonate resin. However, the polycarbonate resin may still have insufficient transparency and impact strength.

SUMMARY OF THE INVENTION

The present invention provides a polycarbonate resin composition that can have excellent fluidity. The polycarbonate resin composition can also have excellent injection moldability, impact strength, chemical resistance, and/or transparency.

The polycarbonate resin composition comprises (A) aromatic polycarbonate in an amount of about 5 to about 95% by weight, (B) siloxane-based polycarbonate in an amount of about 5 to about 90% by weight, and (C) syndiotactic polystyrene in an amount of 0 to about 5% by weight.

In one embodiment of the present invention, the aromatic polycarbonate can be prepared by reacting (A-1) aromatic dihydroxy compound with (A-2) carbonate precursor.

In one embodiment of the present invention, the siloxane-based polycarbonate includes a compound represented by the following Chemical Formula 5 in the main chain of polycarbonate.

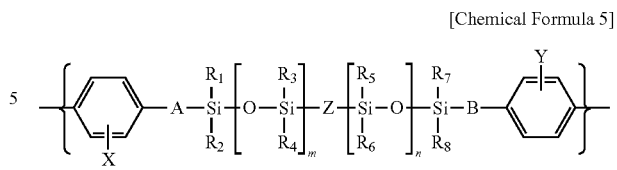

[Chemical Formula 5]

In Chemical Formula 5, $R_1$ to $R_8$ are the same or different and are each independently $C_1$ to $C_{10}$ alkyl, $C_6$ to $C_{18}$ aryl, halogen or $C_1$ to $C_{10}$ alkoxy substituted $C_1$ to $C_{10}$ alkyl, or halogen or $C_1$ to $C_{10}$ alkoxy substituted $C_6$ to $C_{18}$ aryl;

A and B are the same or different and are each independently $C_2$ to $C_{12}$ alkylene, $C_8$ to $C_{20}$ arylene, $C_2$ to $C_{12}$ alkylene including —O— or —S— in the chain thereof, or $C_8$ to $C_{20}$ arylene including O— or —S— in the chain thereof;

X and Y are the same or different and are each independently hydrogen, halogen, $C_1$ to $C_{18}$ alkoxy, $C_1$ to $C_{10}$ alkyl, or $C_6$ to $C_{18}$ aryl;

Z is substituted or unsubstituted $C_1$ to $C_{18}$ alkylene, substituted or unsubstituted $C_6$ to $C_{18}$ cycloalkylene, or substituted or unsubstituted $C_6$ to $C_{18}$ arylene;

m and n are the same or different and are each independently an integer of 1 to 60, wherein m+n is an integer of 8 to 100.

As used herein, unless otherwise defined, the term "substituted" means that one or more hydrogen atoms of a substituent is replaced with $C_1$ to $C_6$ alkyl, $C_6$ to $C_{18}$ aryl, halogen or a combination thereof.

In one embodiment of the present invention, the compound represented by Chemical Formula 5 can be included in an amount of about 1 to about 20% by weight based on 100% by weight (the total weight) of the siloxane-based polycarbonate.

In another embodiment of the present invention, the amount of Si in the siloxane-based polycarbonate can be about 0.3 to about 10% by weight based on 100% by weight (the total weight) of the siloxane-based polycarbonate.

In another embodiment of the present invention, the siloxane-based polycarbonate can be prepared by reacting (B-1) one or more diphenyls and (B-2) bishydroxyarylsiloxane with (B-3) carbonate precursor.

In one embodiment of the present invention, the bishydroxyarylsiloxane can be prepared by (1) reacting siloxane which is terminated with hydrogen represented by the following Chemical Formula 4A and a phenol derivative represented by the following Chemical Formula 4B to synthesize a monohydroxysiloxane represented by the following Chemical Formula 4C; and (2) reacting the monohydroxysiloxane and a diene to synthesize bishydroxyarylsiloxane.

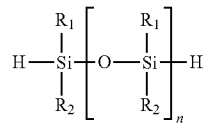

[Chemical Formula 4A]

In Chemical Formula 4A, $R_1$ and $R_2$ are the same or different and are each independently $C_1$ to $C_{10}$ alkyl, $C_6$ to $C_{18}$ aryl, halogen or $C_1$ to $C_{10}$ alkoxy substituted $C_1$ to $C_{10}$ alkyl, or halogen or $C_1$ to $C_{10}$ alkoxy substituted $C_6$ to $C_{18}$ aryl; and n is an integer from 4 to 100;

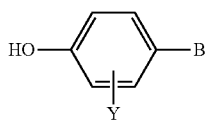

[Chemical Formula 4B]

In Chemical Formula 4B, B is $C_2$ to $C_{12}$ alkylene having a double bond at a terminal end thereof, $C_8$ to $C_{20}$ arylene having a double bond at a terminal end thereof, $C_2$ to $C_{12}$ alkylene group having a double bond at a terminal end thereof and including —O— or —S— in the chain thereof, or $C_8$ to $C_{20}$ arylene having a double bond at a terminal end thereof and including —O— or —S— in the chain thereof; and Y is hydrogen, halogen, $C_1$ to $C_{18}$ alkoxy, $C_1$ to $C_{10}$ alkyl, or $C_6$ to $C_{18}$ aryl;

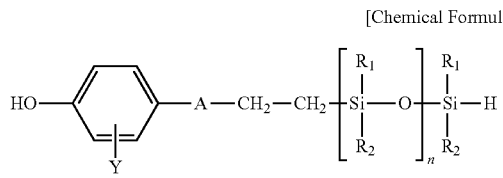

[Chemical Formula 4C]

In Chemical Formula 4C, $R_1$ and $R_2$ are the same or different and are each independently $C_1$ to $C_{10}$ alkyl, $C_6$ to $C_{18}$ aryl, halogen or $C_1$ to $C_{10}$ alkoxy substituted $C_1$ to $C_{10}$ alkyl, or halogen or $C_1$ to $C_{10}$ alkoxy substituted $C_6$ to $C_{18}$ aryl; A is a single bond, $C_1$ to $C_{10}$ alkylene, $C_6$ to $C_{18}$ arylene, $C_1$ to $C_{10}$ alkylene including —O— or —S— in the chain thereof, or $C_6$ to $C_{18}$ arylene including —O— or —S— in the chain thereof; Y is hydrogen, halogen, $C_1$ to $C_{18}$ alkoxy, $C_1$ to $C_{10}$ alkyl, or $C_6$ to $C_{18}$ aryl; and n is an integer from 4 to 100.

In one embodiment of the present invention, the siloxane-based polycarbonate can have a weight average molecular weight (Mw) from about 10,000 to about 200,000 g/mol.

In one embodiment of the present invention, the syndiotactic polystyrene can have a degree of syndiotacticity from about 97 to about 100%.

In yet another embodiment of the present invention, the polycarbonate resin composition further can comprise one or more additives selected from the group consisting of UV stabilizers, fluorescent brightening agents, lubricants, releasing agents, nucleating agents, antistatic agents, antioxidants, thermo-stabilizers, reinforcing materials, inorganic additives, pigments, dyes, and combinations thereof.

In one embodiment of the present invention, the polycarbonate resin composition can have a melt flow index of about 19 to about 22 g/10 min, wherein the melt flow index is measured for a 10 kg load at 250° C. in accordance with ASTM D1238

In another embodiment of the present invention, the polycarbonate resin composition can have a flow field length of about 115 to about 130 mm, wherein the flow field length is measured for an injection molded spiral specimen having a thickness of 1 mm prepared at an injection molding temperature of 300 to 320° C. and a mold temperature of 50 to 90° C. using a 10 oz injection molding machine In one embodiment of the present invention, the polycarbonate resin composition can have a notch Izod impact strength of about 45 to about 60 kgf·cm/cm, wherein the notch Izod impact strength is measured for a specimen having a thickness 6.35 mm in accordance with ASTM D256.

In yet another embodiment of the present invention, the polycarbonate resin composition can have a brittle fracture rate of about 0 to about 5%, wherein the brittle fracture rate is measured by preparing specimens with a size of 5 cm×20 cm×2 mm by injection molding, immersing these specimens into thinner for two minutes, followed by drying. A metal tip is placed at the gate portions of 20 specimens and a 2 kg of load is dropped from a height of 70 cm to hit the gate portions. The brittle fracture rate is measured for the broken number of the specimens as a result of dropping.

In one embodiment of the present invention, the polycarbonate resin composition can have a haze of about 1.0 to about 2.5%, wherein the haze is measured for a specimen having a thickness of 2 mm using a Haze meter YDP02-OD manufactured by Nippon Denshoku.

In one embodiment of the present invention, the polycarbonate resin composition can have a transmittance of about 85 to about 90%, wherein the transmittance is measured for a specimen having a thickness of 2 mm using a Haze meter YDP02-OD manufactured by Nippon Denshoku.

The polycarbonate resin composition according to the present invention can have excellent fluidity, injection moldability, impact strength, chemical resistance, and/or transparency.

DETAILED DESCRIPTION OF THE INVENTION

The present invention now will be described more fully hereinafter in the following detailed description of the invention in which some but not all embodiments of the invention are described. Indeed, this invention may be embodied in many different forms and should not be construed as limited to the embodiments set forth herein; rather, these embodiments are provided so that this disclosure will satisfy applicable legal requirements.

The polycarbonate resin composition according to the present invention can comprise (A) aromatic polycarbonate in an amount of about 5 to about 95% by weight, (B) siloxane-based polycarbonate in an amount of about 5 to about 90% by weight, and (C) syndiotactic polystyrene in an amount of 0 to about 5% by weight.

(A) Aromatic Polycarbonate

The aromatic polycarbonate can be prepared by reacting (A-1) one or more aromatic dihydroxy compounds with (A-2) a carbonate precursor.

(A-1) Aromatic Dihydroxy Compound

The aromatic dihydroxy compound can be a compound represented by the follow Chemical Formula 1 or a combination thereof.

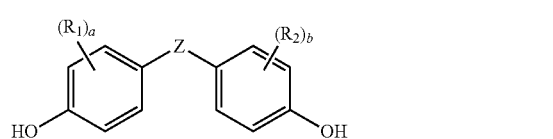

[Chemical Formula 1]

In Chemical Formula 1, $R_1$ and $R_2$ are the same or different and are each independently hydrogen, halogen, or $C_1$ to $C_8$ alkyl;

a and b are the same or different and are each independently integers from 0 to 4; and Z is a single bond, $C_1$ to $C_8$ alkylene, $C_2$ to $C_8$ alkylidene, $C_5$ to $C_{15}$ cycloalkylene, $C_5$ to $C_{15}$ cycloalkylidene, —S—, —SO—, $SO_2$, —O—, or —CO—.

Examples of aromatic dihydroxy compound can include without limitation bis(hydroxyl aryl)alkanes, such as bis(4-hydroxyphenyl)methane, bis(3-methyl-4-hydroxy phenyl)methane, bis(3-chloro-4-hydroxy phenyl)methane, bis(3,5-dibromo-4-hydroxy phenyl)methane, 1,1-bis(4-hydroxy phenyl)ethane, 1,1-bis(2-tert-butyl-4-hydroxy-3-methyl phenyl)ethane, 2,2-bis(4-hydroxy phenyl)propane (bisphenol A), 2,2-bis(3-methyl-4-hydroxy phenyl)propane, 2,2-bis(2-methyl-4-hydroxy phenyl)propane, 2,2-bis(3,5-dimethyl-4-hydroxy phenyl)propane, 1,1-bis(2-tert-butyl-4-hydroxy-5-methyl phenyl)propane, 2,2-bis(3-chloro-4-hydroxy phenyl)propane, 2,2-bis(3-fluoro-4-hydroxy phenyl)propane, 2,2-bis(3-bromo-4-hydroxy phenyl)propane, 2,2-bis(3,5-difluoro-4-hydroxy phenyl)propane, 2,2-bis(3,5-dichloro-4-hydroxy phenyl)propane, 2,2-bis(3,5-dibromo-4-hydroxy phenyl)propane, 2,2-bis(4-hydroxy phenyl)butane, 2,2-bis(4-hydroxy phenyl)octane, 2,2-bis(4-hydroxy phenyl)phenyl methane, 2,2-bis(4-hydroxy-1-methyl phenyl)propane, 1,1-bis(4-hydroxy-tert-butyl phenyl)propane, 2,2-bis(4-hydroxy-3-bromophenyl)propane, 2,2-bis(4-hydroxy-3,5-dimethylphenyl)propane, 2,2-bis(4-hydroxy-3,5-dimethyl phenyl)propane, 2,2-bis(4-hydroxy-3-chlorophenyl)propane, 2,2-bis(4-hydroxy-3,5-dichloro phenyl)propane, 2,2-bis(4-hydroxy-3,5-dibromo phenyl)propane, 2,2-bis(3-bromo-4-hydroxy-5-chloro phenyl)propane, 2,2-bis(3-phenyl-4-hydroxy phenyl)propane, 2,2-bis(4-hydroxy phenyl)butane, 2,2-bis(3-methyl-4-hydroxy phenyl)butane, 1,1-bis(2-butyl-4-hydroxy-5-methyl phenyl)butane, 1,1-bis(2-tert-butyl-4-hydroxy-5-methyl phenyl)butane, 1,1-bis(2-tert-butyl-4-hydroxy-5-methyl phenyl)isobutane, 1,1-bis(2-tert-amyl-4-hydroxy-5-methyl phenyl)butane, 2,2-bis(3,5-dichloro-4-hydroxy phenyl)butane, 2,2-bis(3,5-dibromo-4-hydro phenyl)butane, 4,4-bis(4-hydroxy phenyl)heptane, 1,1-bis(2-tert-butyl-4-hydroxy-5-methyl phenyl)heptane, 2,2-bis(4-hydroxy phenyl)octane, and 1,1-(4-hydroxy phenyl)ethane; bis(hydroxyl aryl)cycloalkanes such as 1,1-bis(4-hydroxy phenyl)cyclopentane, 1,1-bis(4-hydroxy phenyl)cyclohexane, 1,1-bis(3-methyl-4-hydroxy phenyl)cyclohexane, 1,1-bis(3-cyclohexyl-4-hydroxy phenyl)cyclohexane, 1,1-bis(3-phenyl-4-hydroxy phenyl)cyclohexane, and 1,1-bis(4-hydroxy phenyl)-3,5,5-trimethylcyclohexane; bis(hydroxyl aryl)ethers such as bis(4-hydroxy phenyl)ether, and bis(4-hydroxy-3-methyl phenyl)ether; bis(hydroxyl aryl)sulfides such as bis(4-hydroxy phenyl)sulfide and bis(3-methyl-4-hydroxy phenyl) sulfide; bis(hydroxyl aryl)sulfoxides such as bis(hydroxyl phenyl)sulfoxide, bis(3-methyl-4-hydroxy phenyl)sulfoxide, and bis(3-phenyl-4-hydroxy phenyl)sulfoxide; bis(hydroxyl aryl)sulfones such as bis(4-hydroxy phenyl)sulfone, bis(3-methyl-4-hydroxy phenyl)sulfone and bis(3-phenyl-4-hydroxy phenyl)sulfone; biphenyl compounds such as 4,4'-dihydroxy biphenyl, 4,4'-dihydroxy-2,2'-dimethylbiphenyl, 4,4'-dihydroxy-3,3'-dimethylbiphenyl, 4,4'-dihydroxy-3,3'-dicyclobiphenyl, and 3,3'-difluoro-4,4'-dihydroxy biphenyl; and the like; and combinations thereof.

Aromatic dihydroxy compounds which can be used other than or in addition to the compounds represented by the Chemical Formula 1 can include without limitation dihydroxy benzene, halogen or $C_1$-$C_{10}$ alkyl substituted dihydroxy benzene and the like, and combinations thereof. Examples can include without limitation resorcinol, 3-methylresorcinol, 3-ethylresorcinol, 3-propylresorcinol, 3-butylresorcinol, 3-tert-butylresorcinol, 3-phenyl resorcinol, 2,3,4,6-tetrafluororesorcinol, 2,3,4,6-tetrabromoresorcinol, catechol, hydroquinone, 3-methylhydroquinone, 3-ethylhydroquinone, 3-propylhydroquinone, 3-butylhydroquinone, 3-tert-butylhydroquinone, 3-phenylhydroquinone, 3-cumylhydroquinione, 2,5-dichlorohydroquinone, 2,3,5,6-tetramethylhydroquinone, 2,3,5,6-tetra-tert-butylhydroquinone, 2,3,5,6-tetrafluorohydroquinone, 2,3,5,6-tetrabromo hydroquinone and the like, and combinations thereof.

In one embodiment of the present invention, 2,2-bis(4-hydroxy phenyl)propane (bisphenol A) can be used as the aromatic dihydroxy compound.

(A-2) Carbonate Precursors

Examples of the carbonate precursor can include without limitation dimethyl carbonate, diethyl carbonate, dibutyl carbonate, dicyclohexyl carbonate, diphenyl carbonate, ditoryl carbonate, bis(chlorophenyl)carbonate, m-cresyl carbonate, dinaphthyl carbonate, bis(diphenyl)carbonate, carbonyl chloride(phosgene), triphosgen, diphosgene, carbonyl bromide, bishaloformate and the like. These compounds can be used singly or as a mixture of two or more. In interfacial polymerization, carbonyl chloride (phosgene) can be used as the carbonate precursor In one embodiment of the present invention, the carbonate precursor can be used in molar ratio of about 0.9 to about 1.5 based on about 1 mol of the aromatic dihydroxy compound.

In another embodiment of the present invention, the carbonate precursor can comprise diaryl carbonate and the compound represented by the following Chemical Formula 2. In this case, the thermal resistance and color stability of the polycarbonate resin composition can be further improved.

[Chemical Formula 2]

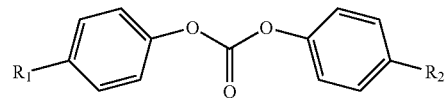

In Chemical Formula 2, $R_1$ is hydrogen, tertiary butyl, or p-cumyl, and $R_2$ is tertiary butyl or p-cumyl.

In one embodiment of the present invention, the carbonate precursor can comprise the diaryl carbonate in an amount of about 60 to 95 about mol % and the compound represented by Chemical Formula 2 in an amount of about 5 to about 40 mol %.

The compound represented by Chemical Formula 2 can be input before or during the ester exchange reaction. These ester exchange reaction can be executed in the same reaction system.

In one embodiment of the present invention, the aromatic dihydroxy compound can be used in a molar ratio of about 0.7 to about 1.5, for example about 0.8 to about 1.2, based on about 1 mol of the diaryl carbonate. In this case, the mechanical strength of the polycarbonate resin composition can be further improved.

In the present invention, the polycarbonate resin composition can include the aromatic polycarbonate in an amount of about 5 to about 95% by weight, for example, about 40 to about 90% by weight, based on 100% by weight (the total weight) of the polycarbonate resin composition. In some embodiments, the polycarbonate resin composition can include the aromatic polycarbonate in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70 71, 72, 73, 74, 75, 76, 77, 78, 79, 80, 81, 82, 83, 84, 85, 86, 87, 88, 89, 90, 91, 92, 93, 94, or 95% by weight. Further, according to some embodiments of the present invention, the aromatic polycarbonate may be present in an amount of from about any of the foregoing amounts to about any other of the foregoing amounts.

When the polycarbonate resin composition includes the aromatic polycarbonate in an amount within the above range, fluidity, impact strength, chemical resistance, and/or transparency can be excellent.

In exemplary embodiments of the present invention, the polycarbonate resin composition can include the aromatic polycarbonate in an amount of about 45% by weight, about 60% by weight, about 75% by weight, or about 87% by weight based on 100% by weight of the polycarbonate resin composition.

(B) Siloxane-Based Polycarbonate

The siloxane-based polycarbonate can comprise a compound represented by the following Chemical Formula 5 in the main chain of polycarbonate.

[Chemical Formula 5]

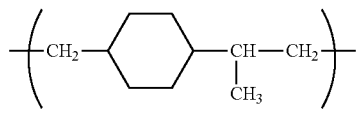

In the above Chemical Formula 5, $R_1$ to $R_8$ are the same or different and are each independently $C_1$ to $C_{10}$ alkyl, $C_6$ to $C_{18}$ aryl, halogen or $C_1$ to $C_{10}$ alkoxy substituted $C_1$ to $C_{10}$ alkyl, or halogen or $C_1$ to $C_{10}$ alkoxy substituted $C_6$ to $C_{18}$ aryl;

A and B are the same or different and are each independently $C_2$ to $C_{12}$ alkylene, $C_8$ to $C_{20}$ arylene, $C_2$ to $C_{12}$ alkylene including —O— or —S— in the chain thereof, or $C_8$ to $C_{20}$ arylene having —O— or —S— in the chain thereof;

X and Y are the same or different and are each independently hydrogen, halogen, $C_1$ to $C_{18}$ alkoxy, $C_1$ to $C_{10}$ alkyl, or $C_6$ to $C_{18}$ aryl;

Z is substituted or unsubstituted $C_1$ to $C_{18}$ alkylene, substituted or unsubstituted $C_6$ to $C_{18}$ cycloalkylene, or substituted or unsubstituted $C_6$ to $C_{18}$ arylene; and m and n are the same or different and are each independently an integer of 1 to 60, wherein m+n is an integer of 8 to 100.

As used here, unless otherwise defined, the term "substituted" means that one or more hydrogen atoms of a substituent is replaced with $C_1$ to $C_6$ alkyl, $C_6$ to $C_{18}$ aryl, halogen or a combination thereof.

In the Chemical Formula 5, "alkyl" includes linear or branched alkyl.

In the Si—Z—Si bond, Si can be directly bonded to Z or to a substituent which is included in the Z group.

In one embodiment of the present invention, $R_1$ to $R_8$ are each independently $C_1$ to $C_6$ alkyl, for example methyl.

In one embodiment of the present invention, A and B are each independently $C_2$ to $C_6$ alkylene, for example propylene.

In yet another embodiment of the present invention, X and Y are each independently hydrogen or $C_1$ to $C_3$ alkoxy, for example hydrogen or methoxy.

In one embodiment of the present invention, one to four of each of X and Y can be independently present on the benzene ring, for example one to two of each of X and Y can be independently present on the benzene ring.

In another embodiment of the present invention, Z is substituted or unsubstituted $C_1$ to $C_{10}$ alkylene, substituted or unsubstituted $C_6$ to $C_{10}$ cycloalkylene, or substituted or unsubstituted $C_6$ to $C_{10}$ arylene. As used herein with reference to Z, the term substituted can mean that one or more hydrogen atoms of the substituent is replaced with $C_1$ to $C_6$ alkyl, for example $C_1$ to $C_3$ alkyl.

In one embodiment of the present invention, Z has the following structure:

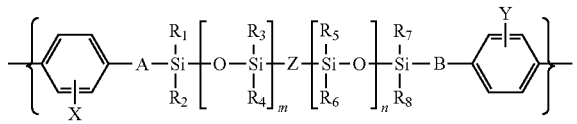

In one embodiment of the present invention, m+n is an integer from 20 to 50, for example 20 to 40.

In Chemical Formula 5, since Z is present, it is possible to modify the interior structure of the siloxane-based polycarbonate chain by controlling Z. This in turn can allow one to adjust the physical properties of polycarbonate resin composition depending on the end use of the same. For example, if Z is arylene, both transparency and chemical resistance can be further improved as compared to linear alkylene.

In another embodiment of the present invention, the siloxane-based polycarbonate can include the compound represented by the above Chemical Formula 5 in an amount of about 1 to about 20% by weight, for example about 1 to about 13% by weight, based on 100% by weight (the total weight) of the siloxane-based polycarbonate. In some embodiments, the siloxane-based polycarbonate can include the compound represented by the above Chemical Formula 5 in an amount of about 1, 2, 3, 4, 5, 6, 7, 8, 9, 10, 11, 12, 13, 14, 15, 16, 17, 18, 19, or 20% by weight. Further, according to some embodiments of the present invention, the polycarbonate may be present in an amount of from about any of the foregoing amounts to about any other of the foregoing amounts.

When the siloxane-based polycarbonate includes the compound represented by Chemical Formula 5 in an amount within the above range, both impact strength and transparency of the polycarbonate resin composition can be excellent.

In one embodiment of the present invention, the siloxane-based polycarbonate can comprise Si in an amount of about 0.3 to about 10% by weight, for example about 0.3 to about 7% by weight, based on 100% by weight (the total weight) of the siloxane-based polycarbonate. In some embodiments, the siloxane-based polycarbonate can include Si in an amount of about 0.3, 0.4, 0.5, 0.6, 0.7, 0.8, 0.9, 1, 2, 3, 4, 5, 6, 7, 8, 9, or 10% by weight. Further, according to some embodiments of the present invention, Si may be present in an amount of from about any of the foregoing amounts to about any other of the foregoing amounts.

When the siloxane-based polycarbonate includes Si in an amount within the above range, the polycarbonate resin composition can have excellent impact strength and transparency.

In another embodiment of the present invention, the siloxane-based polycarbonate can be prepared by reacting (B-1) one or more diphenyls and (B-2) bishydroxyarlysiloxane with (B-3) carbonate precursor.

(B-1) Diphenyls

The diphenyls are compounds represented by the following Chemical Formula 3 or a combination thereof

[Chemical Formula 3]

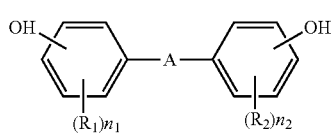

In Chemical Formula 3,

A is a single bond, substituted or unsubstituted linear or branched $C_1$ to $C_{30}$ alkylene, substituted or unsubstituted $C_2$ to $C_5$ alkenylene, substituted or unsubstituted $C_2$ to $C_5$ alkylidene, substituted or unsubstituted linear or branched $C_1$ to $C_{30}$ haloalkylene, substituted or unsubstituted $C_5$ to $C_6$ cycloalkyene, substituted or unsubstituted $C_5$ to $C_6$ cycloalkenylene group, substituted or unsubstituted $C_5$ to $C_{10}$ cycloalkylidene, substituted or unsubstituted $C_6$ to $C_{30}$ arylene, substituted or unsubstituted linear or branched $C_1$ to $C_{20}$ alkoxylene, halogen acid ester group, carbonic ester, CO, S, or $SO_2$;

$R_1$ and $R_2$ are the same or different and are each independently substituted or unsubstituted $C_1$ to $C_{30}$ alkyl or substituted or unsubstituted $C_6$ to $C_{30}$ aryl; and $n_1$ and $n_2$ are the same or different and are each independently an integer from 0 to 4.

In Chemical Formula 3, the term "substituted" means that one or more hydrogen atoms is substituted with halogen, $C_1$ to $C_{30}$ alkyl, $C_1$ to $C_{30}$ haloalkyl, $C_6$ to $C_{30}$ aryl, $C_1$ to $C_{20}$ alkoxy or a combination thereof.

Examples of compound represented by Chemical Formula 3 can include without limitation hydroquinone, resorcinol, 4,4'-dihydroxydiphenyl, 2,2-bis(4-hydroxyphenyl)propane (called as tisphenol-A'), 2,4-bis(4-hydroxyphenyl)-2-methylbutane, bis(4-hydroxyphenyl)methane, 1,1-bis(4-hydroxyphenyl)cyclohexane, 2,2-bis(3-chloro-4-hydroxyphenyl)propane, 2,2-bis(3,5-dimethyl-4-hydroxyphenyl)propane, 2,2-bis(3,5-dichloro-4-hydroxyphenyl)propane, 2,2-bis(3,5-dibromo-4-hydroxyphenyl)propane, bis(4-hydroxyphenyl)sulfoxide, bis(4-hydroxyphenyl)ketone, bis(4-hydroxyphenyl)ether and the like, and combinations thereof.

In one embodiment, the compound represented by Chemical Formula 3 can include 2,2-bis(4-hydroxyphenyl)propane, 2,2-bis(3,5-dichloro-4-hydroxyphenyl)propane, 1,1-bis(4-hydroxyphenyl)cyclohexane, or a combination thereof, for example 2,2-bis(4-hydroxyphenyl)propane.

(B-2) Bishydroxyarylsiloxane

The bishydroxyarylsiloxane is a compound represented by the following Chemical Formula 4 or a combination thereof.

[Chemical Formula 4]

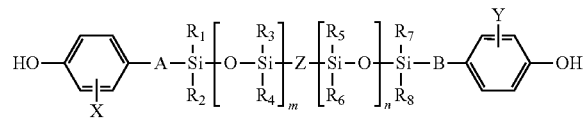

In Chemical Formula 4, $R_1$ to $R_8$ are the same or different and are each independently $C_1$ to $C_{10}$ alkyl, $C_6$ to $C_{18}$ aryl, halogen or $C_1$ to $C_{10}$ alkoxy substituted $C_1$ to $C_{10}$ alkyl, or halogen or $C_1$ to $C_{10}$ alkoxy substituted $C_6$ to $C_{18}$ aryl;

A and B are the same or different and are each independently $C_2$ to $C_{12}$ alkylene, $C_8$ to $C_{20}$ arylene, $C_2$ to $C_{12}$ alkylene including —O— or —S— in the chain thereof, or $C_8$ to $C_{20}$ arylene including —O— or —S— in the chain thereof;

X and Y are the same or different and are each independently hydrogen, halogen, $C_1$ to $C_{18}$ alkoxy, $C_1$ to $C_{10}$ alkyl, or $C_6$ to $C_{18}$ aryl;

Z is substituted or unsubstituted $C_1$ to $C_{18}$ alkylene, substituted or unsubstituted $C_6$ to $C_{18}$ cycloalkylene, or substituted or unsubstituted $C_6$ to $C_{18}$ arylene, wherein in the definition of Z, the term "substituted" means that one or more hydrogen atoms is replaced with $C_1$ to $C_6$ alkyl, $C_6$ to $C_{18}$ aryl, halogen, or a combination thereof; and m and n each are the same or different and are each independently an integer from 1 to 60, and m+n is an integer from 8 to 100.

In Chemical Formula 4, the term "alkyl" includes linear and/or branched alkyl.

In the Si—Z—Si bond, Si can be bound directly to Z itself or bound to a substituent included in Z.

In one embodiment of the present invention, $R_1$ to $R_8$ each are independently $C_1$ to $C_6$ alkyl, for example methyl.

In one embodiment of the present invention, A and B each are independently $C_2$ to $C_6$ alkylene, for example propylene.

In another embodiment of the present invention, X and Y each are independently hydrogen or $C_1$ to $C_3$ alkoxy, for example hydrogen or methoxy.

In one embodiment of the present invention, one to four, for example one to two, of each of X and Y can be independently present on the benzene ring.

In another example of the present invention, Z is substituted or unsubstituted $C_1$ to $C_{10}$ alkylene, substituted or unsubstituted $C_6$ to $C_{10}$ cycloalkylene, or substituted or unsubstituted $C_6$ to $C_{10}$ arylene. As used herein with respect to Z, the term "substituted" means that one or more hydrogen atoms is replaced with $C_1$ to $C_6$ alkyl, for example $C_1$ to $C_3$ alkyl.

In one embodiment of the present invention, m+n is an integer from 20 to 50, for example an integer from 20 to 40.

In one embodiment of the present invention, the bishydroxyarylsiloxane is a compound represented by one of the following Chemical Formula 4-1, 4-2, 4-3, 4-4, 4-5, 4-6, 4-7, 4-8, or a combination thereof

[Chemical Formula 4-1]

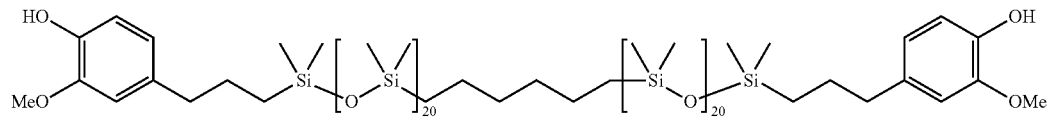

-continued

[Chemical Formula 4-2]
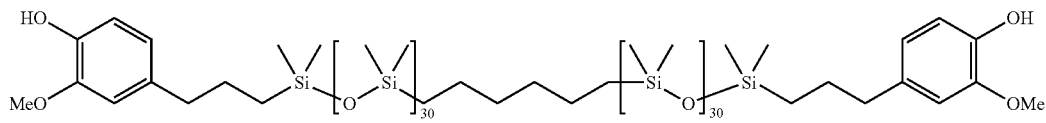

[Chemical Formula 4-3]
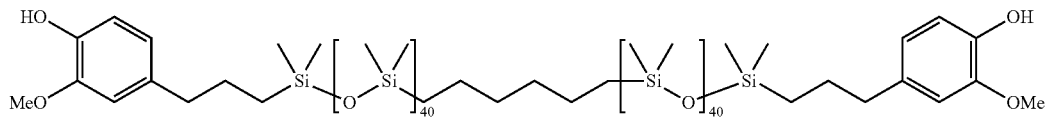

[Chemical Formula 4-4]
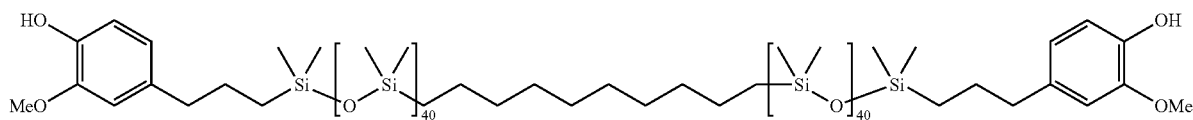

[Chemical Formula 4-5]
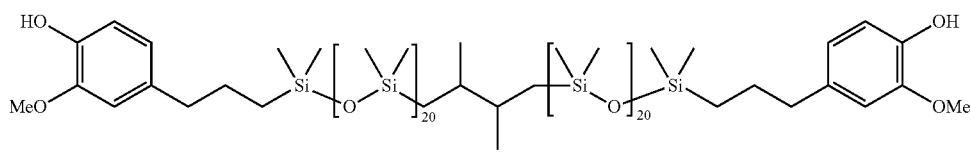

[Chemical Formula 4-6]
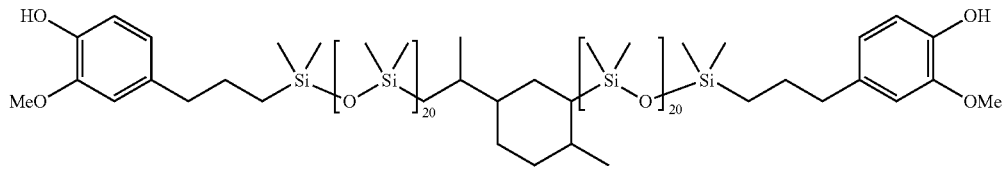

[Chemical Formula 4-7]
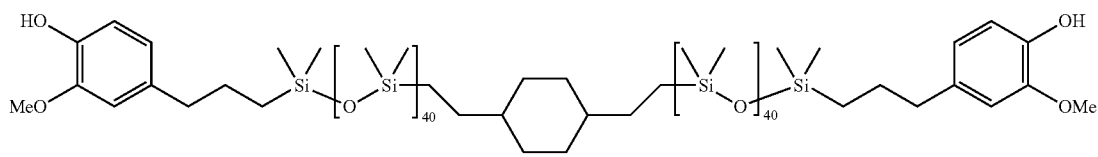

[Chemical Formula 4-8]
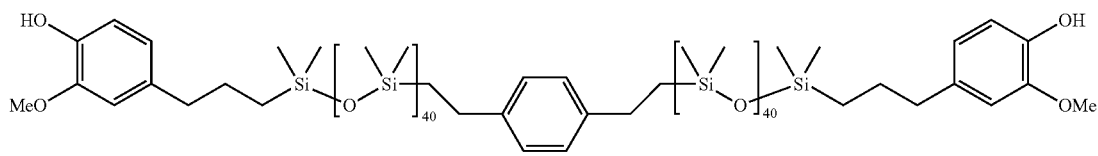

In one embodiment of the present invention, the compound represented by Chemical Formula 4 can be prepared by (1) reacting a siloxane which is terminated with hydrogen represented by the following Chemical Formula 4A and a phenol derivative represented by the following Chemical Formula 4B to synthesize monohydroxysiloxane represented by the following Chemical Formula 4C; and (2) reacting the monohydroxysiloxane and a diene to synthesize a bishydroxyarylsiloxane.

[Chemical Formula 4A]
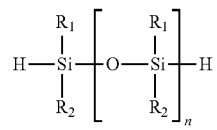

In Chemical Formula 4A, $R_1$ and $R_2$ are the same or different and are each independently $C_1$ to $C_{10}$ alkyl, $C_6$ to $C_{18}$ aryl, halogen or $C_1$ to $C_{10}$ alkoxy substituted $C_1$ to $C_{10}$ alkyl, or halogen or $C_1$ to $C_{10}$ alkoxy substituted $C_6$ to $C_{18}$ aryl; and n is an integer from 4 to 100;

[Chemical Formula 4B]

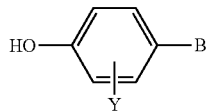

In Chemical Formula 4B, B is $C_2$ to $C_{12}$ alkylene having a double bond at its terminal, $C_8$ to $C_{20}$ arylene having a double bond at its terminal, $C_2$ to $C_{12}$ alkylene having a double bond at its terminal and including —O— or —S— in the chain thereof, or $C_8$ to $C_{20}$ arylene having a double bond at its terminal and including —O— or —S— in the chain thereof; and Y is hydrogen, halogen, $C_1$ to $C_{18}$ alkoxy, $C_1$ to $C_{10}$ alkyl, or $C_6$ to $C_{18}$ aryl;

[Chemical Formula 4C]

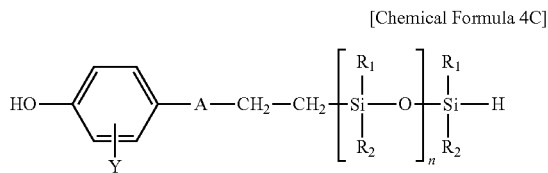

In Chemical Formula 4C, $R_1$ and $R_2$ are the same or different and are each independently $C_1$ to $C_{10}$ alkyl, $C_6$ to $C_{18}$ aryl, halogen or $C_1$ to $C_{10}$ alkoxy substituted $C_1$ to $C_{10}$ alkyl, or halogen or $C_1$ to $C_{10}$ alkoxy substituted $C_6$ to $C_{18}$ aryl; A is a single bond, $C_1$ to $C_{10}$ alkylene, $C_6$ to $C_{18}$ arylene, $C_1$ to $C_{10}$ alkylene including —O— or —S— in the chain thereof, or $C_6$ to $C_{18}$ arylene having —O— or —S— in the chain thereof; Y is hydrogen, halogen, $C_1$ to $C_{18}$ alkoxy, $C_1$ to $C_{10}$ alkyl, or $C_6$ to $C_{18}$ aryl; and n is an integer from 4 to 100.

The First Stage

The first stage is a step which synthesizes the monohydroxy siloxane represented by Chemical Formula 4C by reacting siloxane which is terminated with hydrogen represented by Chemical Formula 4A and phenol derivative represented by Chemical Formula 4B.

A catalyst including platinum can be used. For example, the catalyst can be a platinum atom itself or a compound including platinum.

Examples of the catalyst can include without limitation $H_2PtCl_6$, $Pt_2\{[(CH_2=CH)Me_2Si]_2O\}_3$, $Rh[(cod)_2]BF_4$, $Rh(PPh_3)_4Cl$, Pt/C and the like. These can be used alone or in combination. In exemplary embodiments, the catalyst can be a Pt/C catalyst, for example 10% Pt/C catalyst.

The catalyst can be used in an amount of about 10 to about 500 ppm, for example about 50 to about 150 ppm.

The first stage reaction can be carried out in an organic solvent. Examples of the organic solvent can include without limitation 1,2-dichloroethane, toluene, xylene, dichlorobenzene and the like. These can be used singly or in combination. In exemplary embodiments, the solvent can include toluene.

In the first stage, the reaction temperature and time can be adjusted according to the reactivity of siloxane which is terminated with hydrogen represented by Chemical Formula 4A and phenol derivative represented by Chemical Formula 4B. For example the first stage can be conducted at a reaction temperature of about 60° C. to about 140° C., for example about 110° C. to about 120° C. and for about 2 to about 12 hours, for example about 3 to about 5 hours.

The monohydroxysiloxane prepared during the first stage and represented by Chemical Formula 4C can be purified and then used in the next stage after purification or can be used in situ during the next stage without additional purification.

The Second Stage

In the second stage the bishydroxyarylsiloxane represented by Chemical Formula 4 by is synthesized by reacting the monohydroxysiloxane and diene.

The diene can be a diene including substituted or unsubstituted $C_1$ to $C_{18}$ alkyl, substituted or unsubstituted $C_6$ to $C_{18}$ cycloalkyl, or substituted or unsubstituted $C_6$ to $C_{18}$ aryl. As used herein with reference to the diene, the term "substituted" means that one or hydrogen atoms is replaced with $C_1$ to $C_6$ alkyl, $C_6$ to $C_{18}$ aryl, halogen, or a combination thereof.

In one embodiment of the present invention, the diene can include substituted or unsubstituted $C_1$ to $C_{10}$ alkyl, substituted or unsubstituted $C_6$ to $C_{10}$ cycloalkyl, or substituted or unsubstituted $C_6$ to $C_{10}$ aryl. As used herein with reference to the diene, the term "substituted" means that one or more hydrogen atoms is replaced with $C_1$ to $C_6$ alkyl, for example $C_1$ to $C_3$ alkyl.

After completing the first stage, the bishydroxyarylsiloxane can be prepared by reacting monohydroxysiloxane represented by Chemical Formula 4C with diene in situ without purification by directly adding diene.

In the second stage, the reaction temperature and time can be adjusted according to the reactivity of the monohydroxysiloxane and diene. For example, the second stage can be conducted at a temperature of about 60 to about 140° C., for example about 110 to about 120° C. and for about 2 to about 12 hours, for example about 3 to about 5 hours.

The bishydroxyarylsiloxane prepared in the second stage can be purified and recovered through general methods. For example, the bishydroxyarylsiloxane represented by Chemical Formula 4 can be obtained by removing the catalyst after filtering the product prepared by the second stage, concentrating the filtrate from which catalyst was removed to remove the organic solvent as well as a by-product of low molecular weight. Also, depending on the purity of the bishydroxyarylsiloxane, additional purification process can be further performed.

For example, the bishydroxyarylsiloxane can be prepared by a process as set forth in the following Reaction Equation 1.

[Reaction equation 1]

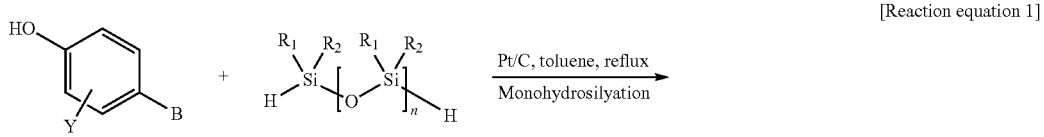

-continued

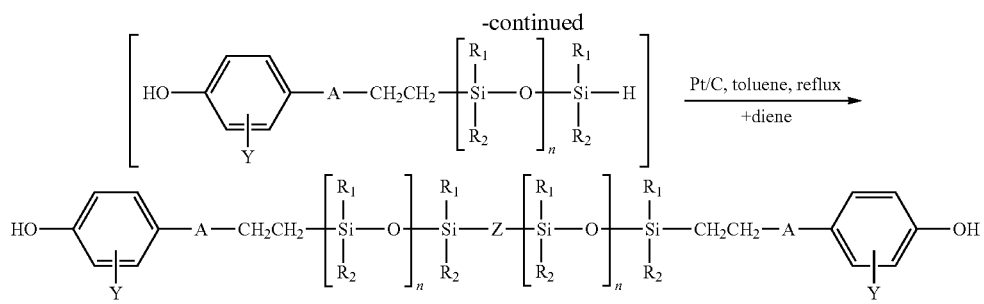

In the above Reaction Equation 1, $R_1$, $R_2$, A, B, Y, Z, and n are the same as defined in Chemical Formula 4A, 4B, 4C, and 4.

In Reaction Equation 1, in the presence of a catalyst (for example Pt/C) and organic solvent (for example toluene), the phenol derivative and siloxane terminated with hydrogen are reacted with each other to synthesize monohydroxysiloxane. The diene can be continuously added in an in situ process in the synthesis of the bishydroxyarylsiloxane.

(B-3) Carbonate Precursors

A carbonate precursor used in the preparation of the aromatic polycarbonate can be used as a carbonate precursor in the preparation of the siloxane-based polycarbonate.

In one embodiment of the present invention, the carbonate precursor can be used in a molar ratio of about 0.9 to about 1.5 based on about 1 mol of a mixture of the diphenyls and the bishydroxyarylsiloxane.

In another embodiment of the present invention, the weight-average molecular weight (Mw) of the siloxane-based polycarbonate can be about 10,000 to about 200,000 g/mol, for example about 20,000 to about 50,000 g/mol.

In the present invention, the polycarbonate resin composition can include the siloxane-based polycarbonate in an amount of about 5 to about 90% by weight, for example about 10 to about 60% by weight, based on 100% by weight of the polycarbonate resin composition. In some embodiments, the polycarbonate resin composition can include the siloxane-based polycarbonate in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70 71, 72, 73, 74, 75, 76, 77, 78, 79, 80, 81, 82, 83, 84, 85, 86, 87, 88, 89, or 90% by weight. Further, according to some embodiments of the present invention, the siloxane-based polycarbonate may be present in an amount of from about any of the foregoing amounts to about any other of the foregoing amounts.

When the polycarbonate resin composition includes the siloxane-based polycarbonate in an amount within the above range, the polycarbonate resin composition can have excellent fluidity, impact strength, chemical resistance, and transparency.

In one embodiment of the present invention, the polycarbonate resin composition can include the siloxane-based polycarbonate in an amount of about 10% by weight, about 25% by weight, about 38% by weight, about 40% by weight, or about 55% by weight based on 100% by weight of the polycarbonate resin composition.

(C) Syndiotactic Polystyrene

In one embodiment of the present invention, the polycarbonate resin composition can further include (C) syndiotactic polystyrene.

Polystyrene is generally categorized as atactic, isotactic, and syndiotactic, depending on the location of the side chain benzene ring. Atactic polystyrene has a structure in which the benzene rings are randomly distributed on both sides of the main chain (hydrocarbon backbone) of the polymer and syndiotactic polystyrene has a structure in which benzene rings are positioned on alternating sides of the hydrocarbon backbone.

Syndiotactic polystyrene can be prepared using styrene monomer and a catalyst system comprised of metallocene catalyst and a cocatalyst. The metallocene catalyst has a structure in which one or two cycloalkane dienyl group (cyclopentadienyl group, indenyl group, fluorenyl group, and its derivatives) are bonded to a transition metal of Group IV of the periodic table of the elements, such as Ti, Zr, and Hf.

U.S. Pat. No. 6,010,974, the entire disclosure of which is incorporated herein by reference, discloses a method of polymerizing styrene monomer using a new alkyl-bridge dinuclei metallocene catalyst, silyl-bridge dinuclei metallocene catalyst and alkyl-silyl bridge dinuclei metallocene catalyst which can provide polystyrene having high stereo-regularity, high melting point, and excellent molecular weight distribution.

U.S. Pat. No. 6,284,700, the entire disclosure of which is also incorporated herein by reference, discloses a new syndiotactic polystyrene produced using a catalyst system comprising metallocene catalyst and cocatalyst.

In the present invention, the syndiotactic polystyrene can be about 97% to about 100% syndiotactic, which can provide excellent chemical resistance.

In the present invention, the polycarbonate resin composition can include the syndiotactic polystyrene in an amount of 0 to about 5% by weight, for example about 1 to about 3% by weight, based on 100% by weight of the polycarbonate resin composition. In some embodiments, the polycarbonate resin composition can include the syndiotactic polystyrene in an amount of 0 (the syndiotactic polystyrene is not present), about 0 (the syndiotactic polystyrene is present), 1, 2, 3, 4, or 5% by weight. Further, according to some embodiments of the present invention, the syndiotactic polystyrene may be present in an amount of from about any of the foregoing amounts to about any other of the foregoing amounts.

When the polycarbonate resin composition includes the syndiotactic polystyrene in an amount greater than about 5% by weight, transparency of polycarbonate resin can be deteriorated.

In one embodiment of the present invention, the polycarbonate resin composition can include the syndiotactic polystyrene in an amount of 0% by weight, about 1% by weight, about 2% by weight, or about 3% by weight, based on 100% by weight of the polycarbonate resin composition.

In another embodiment of this invention, the polycarbonate resin composition can further contain one or more additives according to its individual use.

Examples of the additives can include without limitation UV stabilizers, fluorescent brightening agents, lubricants, releasing agents, nucleating agents, anti-static agents, anti-oxidants, thermo-stabilizers, reinforcing materials, inorganic additives, pigments, dyes, and the like. The additives can be used singly or in combination of two or more.

The additives can be included in an amount of about 1 to about 20 parts by weight, for example about 1 to about 5 parts by weight, based on about 100 parts by weight of a base resin comprising (A)+(B)+(C) defined above.

In one embodiment of the present invention, the polycarbonate resin composition can have a melt flow index of about 19 to about 22 g/10 min. The melt flow index is measured using a 10 kg load at 250° C. in accordance with ASTM D1238.

In one embodiment of the present invention, the polycarbonate resin composition can have a flow field length of about 115 to about 130 mm, wherein the flow field length is measured for an injection molded spiral specimen having a thickness of 1 mm prepared at an injection molding temperature of 300 to 320° C. and a mold temperature of 50 to 90° C. with a 10 oz injection molding machine.

In one embodiment of the present invention, the polycarbonate resin composition can have a notch Izod impact strength of about 45 to about 60 kgf·cm/cm, wherein the notch Izod impact strength is measured in accordance with ASTM D256 using a specimen having a thickness of 6.35 mm.

In another embodiment of the present invention, the polycarbonate resin composition can have a brittle fracture rate of about 0 to about 5%, wherein the brittle fracture rate is measured by preparing specimens with a size of 5 cm×20 cm×2 mm by injection molding, immersing these specimens into thinner for 2 minutes followed by drying, placing a metal tip at the gate portions of 20 specimens and dropping a 2 kg load from a height of 70 cm to hit the gate portions. The brittle fracture rate is measured for the broken number of the specimens.

In one embodiment of the present invention, the polycarbonate resin composition can have a haze of about 1.0 to about 2.5%, wherein the haze is measured for a specimen having a thickness of 2 mm using a Haze meter YDP02-OD manufactured by Nippon Denshoku.

In one embodiment of the present invention, the polycarbonate resin composition can have a transmittance of about 85 to about 90%, wherein the transmittance is measured for a specimen having a thickness of 2 mm using a Haze meter YDP02-OD manufactured by Nippon Denshoku.

The polycarbonate resin composition according to the present invention can be prepared using conventional techniques for making a resin composition. For example, the polycarbonate resin composition according to the present invention can be prepared in the form of pellets after mixing the components and other optional additives and then melting and extruding the mixture using an extruder.

The polycarbonate resin composition according to the present invention can be used to manufacture molded products which require excellent impact strength, chemical resistance, and transparency at the same time.

Also, the polycarbonate resin composition according to this invention can have excellent chemical resistance, and therefore, it can be used in the manufacture of molded products subject to a coating/painting process after injection molding, such as portable electronic devices like cellular phones, digital cameras, MP3 devices, PMPs and the like.

There is no particular limit in the methods of making the molded products using the polycarbonate resin composition according to the present invention. For example, the molded products can be made using extrusion, injection molding, and casting methods known in the art. The molded products can be readily made by the skilled artisan without undue experimentation.

The present invention can be more easily understood with the following examples. The following examples are provided to exemplify the present invention and not intended to limit the scope of protection which is sought by the scope of the attached claims.

EXAMPLES OF THE PRESENT INVENTION

Examples

The composition components used in the examples and comparative examples are as below.

(A) Aromatic Polycarbonate

The polycarbonate (product name: INFINO SC-1080) derived from bisphenol-A from Cheil Industries is used.

(B) Siloxane-Based Polycarbonate

After mixing 130 ml of 9.1% NaOH aqueous solution, 2,2-bis(4-hydroxy phenyl)propane (BPA) (21.1 g, 92.4 mmol), methyltributylammoniumchloride (1.3 g, 5.3 mmol), and 150 ml of methylene chloride, these are strongly stirred, and then 50 ml of methyl chloride solution which is dissolved in triphosgene (10.1 g, 101.7 mmol) is input into the reactor while maintaining the temperature of the solution at 20~25° C. at a pH of 6~7 for 10 min. After that, siloxane polymer A (14.3 g, 6.9 mmol) as set forth below in table 1 which is dissolved in 15 ml of methyl chloride is added and then this solution is stirred for 10 min, while maintaining a pH of 10~12 with 50% NaOH solution. After that, 2,2-bis(4-hydroxy phenyl)propane (BPA) (84.7 g, 371.0 mmol), 150 ml of water, and 150 ml of methylene chloride are input before stirring the mixture for 1 hour. Here, triethylamine (1.0 g, 9.9 mmol), para-cumylphenyl (3.8 g, 17.9 mmol) are added and then 200 ml of methylene chloride solution which is dissolved in triphosgene (40.7 g, 411.6 mmol) is slowly added into the reactor for 1 hour while maintaining a pH of the solution of 1012 with 50% NaOH solution. After completing the stirring, again stirring is performed for 1 hour to separate the organic layer and then 200 ml of 10% HCl solution is added to neutralize the solution. The solution is washed for several times with water till it reaches to a neutral pH. After removing some of solvent from organic layer, polymer is precipitated using methanol. This precipitate is filtered and dried to obtain the polymer in the form of powder. DOSY analysis of polymer indicates that the silicone polymer is bound inside the main chain of polycarbonate. 1H NMR analysis shows that the Si content is 2.5% by weight. The weight average molecular weight (Mw) of the resin estimated by GPC analysis is 21,248 g/mol.

TABLE 1

| Substituent in Chemical Formula 5 | Siloxane polymer A |
|---|---|
| A | $C_3H_6$ |
| B | $C_3H_6$ |

TABLE 1-continued

| Substituent in Chemical Formula 5 | Siloxane polymer A |
|---|---|
| Z | $\left(-CH_2-\text{C}_6H_{10}-CH(CH_3)-CH_2-\right)$ |
| $R_1 \sim R_8$ | $CH_3$ |
| X | $OCH_3$ |
| Y | $OCH_3$ |
| m + n | 20 |

(C) Syndiotactic Polystyrene

The syndiotactic polystyrene (Product name: 130ZC) from Idemitsu Kosan is used.

Examples 1-5 and Comparative Examples 1-4

The above composition components are mixed in the amounts set forth below in Table 1, dried, and then this mixture is fed into an extruder at a speed at 60 kg/hr. By using a twin screw extruder with a screw rpm of 250, diameter of 45 mm, and L/D=36, the extrusion is performed with a nozzle temperature of 250~260° C. The extrusion product is made into pellet form. Prepared pellets are dried for longer than 3 hours at 110° C. and the injection molding is performed at 300° C. to prepare specimens. The physical properties of the prepared specimens are measured using the below methods and the results are indicated in Table 1.

(1) Fluidity: The melt flow index (MI) is measured at 250° C. and 10 kg load in accordance with ASTM D1238.

(2) Injection moldability: Flow field length of the specimen is measured after injection molding a spiral specimen having a thickness of 1 mm at an injection molding temperature of 300~320° C. and a mold temperature of 50~90° C. using a 10 oz injection molding machine.

(3) Impact strength: Izod notch impact strength is measured for a specimen having a thickness of ¼" (6.35 mm) in accordance with ASTM D256.

(4) Chemical resistance: After injection molding a specimen sized 5 cm×20 cm×2 mm with a pinpoint mold, these specimens are immersed into thinner from Aekyung Paint for 2 min and then dried. For 20 numbers of specimens, a metal tip is placed on the gate portion and a 2 kg of load is dropped from a height of 70 cm so that it hits the gate portion. The brittle fracture rate is measured based on the number of specimens that are broken by dropping.

The brittle fracture rate=number of broken specimen/total number of specimen×100

(5) Transparency: Haze and transmission of a specimen having a thickness of 2 mm is measured using a Haze meter (model: YDP02-OD) from Nippon Denshoku.

TABLE 2

| | Examples | | | | | Comparative examples | | | |
|---|---|---|---|---|---|---|---|---|---|
| | 1 | 2 | 3 | 4 | 5 | 1 | 2 | 3 | 4 |
| (A) Aromatic polycarbonate | 87 | 75 | 60 | 60 | 45 | 100 | 97 | 93 | 90 |
| (B) Siloxane-based polycarbonate | 10 | 25 | 40 | 38 | 55 | 0 | 0 | 0 | 0 |
| (C) Syndiotactic polystyrene | 3 | 0 | 0 | 2 | 0 | 0 | 3 | 7 | 10 |
| Melt flow index (g/10 min) | 20.5 | 21.0 | 20.8 | 20.8 | 21.0 | 20.9 | 20.1 | 21.1 | 21.0 |
| Spiral (mm) | 120 | 117 | 117 | 127 | 118 | 111 | 117 | 120 | 120 |
| Izod impact strength (kgf · cm/cm) | 55 | 48 | 49 | 57 | 50 | 22 | 31 | 27 | 25 |
| Brittle fracture rate (%) | 0 | 0 | 0 | 0 | 0 | 100 | 75 | 60 | 60 |
| Haze (%) | 2.3 | 1.2 | 1.5 | 1.9 | 2.4 | 1.2 | 2.0 | 7.3 | 12.4 |
| Transmissivity (%) | 86 | 89 | 88 | 87 | 85 | 88 | 86 | 71 | 66 |

※ The unit of the amount of each component is % by weight.

As shown in the above Table 2, examples 2, 3, and 5 which include aromatic polycarbonate and siloxane-based polycarbonate exhibit excellent fluidity, injection moldability, impact strength, chemical resistance, and transparency. Also, examples 1 and 4 further include syndiotactic polystyrene, and exhibit improved impact strength and injection moldability.

In contrast, comparative example 1, which includes only aromatic polycarbonate, exhibits deteriorated injection moldability, impact strength, and chemical resistance. Comparative example 2, which include only aromatic polycarbonate and syndiotactic polystyrene, exhibit significantly reduced impact strength and chemical resistance. Comparative examples 2 to 4, which include increasing amounts of syndiotactic polystyrene, exhibit significantly decreased transparency.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A polycarbonate resin composition comprising:
   (A) an aromatic polycarbonate in an amount of about 5 to about 95% by weight,
   (B) a siloxane-based polycarbonate in an amount of about 5 to about 90% by weight, and
   C) a syndiotactic polystyrene in an amount of 0 to about 5% by weight,
   wherein the siloxane-based polycarbonate comprises a compound represented by the following Chemical Formula 5 in the main chain of a polycarbonate:

[Chemical Formula 5]

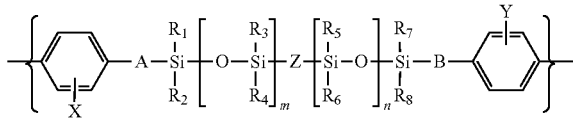

wherein in Chemical Formula 5,
- $R_1$ to $R_8$ are the same or different and are each independently $C_1$ to $C_{10}$ alkyl, $C_6$ to $C_{18}$ aryl, halogen or $C_1$ to $C_{10}$ alkoxy substituted $C_1$ to $C_{10}$ alkyl, or halogen or $C_1$ to $C_{10}$ alkoxy substituted $C_6$ to $C_{18}$ aryl;
- A and B are the same or different and are each independently $C_2$ to $C_{12}$ alkylene, $C_8$ to $C_{20}$ arylene, $C_2$ to $C_{12}$ alkylene including —O— or —S— in the chain thereof, or $C_8$ to $C_{20}$ arylene including —O— or —S— in the chain thereof;
- X and Y are the same or different and are each independently hydrogen, halogen, $C_1$ to $C_{18}$ alkoxy, $C_1$ to $C_{10}$ alkyl, or $C_6$ to $C_{18}$ aryl;
- Z is substituted or unsubstituted $C_1$ to $C_{18}$ alkylene, substituted or unsubstituted $C_6$ to $C_{18}$ cycloalkylene, or substituted or unsubstituted $C_6$ to $C_{18}$ arylene; and
- m and n are the same or different and are each independently an integer of 1 to 60, and
- m+n is an integer of 8 to 100.

2. The polycarbonate resin composition of claim 1, wherein the aromatic polycarbonate is prepared by reacting (A-1) aromatic dihydroxy compound with (A-2) carbonate precursor.

3. The polycarbonate resin composition of claim 2, wherein the aromatic dihydroxy compound (A-1) is a compound represented by following Chemical Formula 1 or a combination thereof:

[Chemical Formula 1]

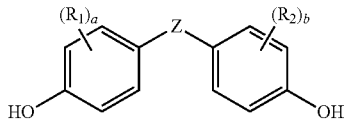

wherein in Chemical Formula 1,
- $R_1$ and $R_2$ are the same or different and are each independently hydrogen, halogen, or $C_1$ to $C_8$ alkyl;
- a and b are the same or different and are each independently an integer from 0 to 4; and
- Z is a single bond, $C_1$ to $C_8$ alkylene, $C_2$ to $C_8$ alkylidene, $C_5$ to $C_{15}$ cycloalkylene, $C_5$ to $C_{15}$ cycloalkylidene, —S—, —SO—, —SO_2—, —O—, or —CO—.

4. The polycarbonate resin composition of claim 2, wherein the carbonate precursor (A-2) comprises diaryl carbonate in an amount of about 60 to about 95 mol% and a compound represented by the following Chemical Formula 2 in an amount of about 5 to about 40 mol%:

[Chemical Formula 2]

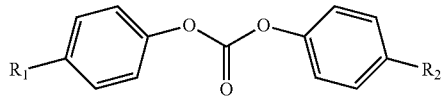

wherein in Chemical Formula 2, $R_1$ is hydrogen, tertiary butyl, or p-cumyl, and $R_2$ is tertiary butyl or p-cumyl.

5. The polycarbonate resin composition of claim 1, wherein the siloxane-based polycarbonate includes the compound represented by Chemical Formula 5 in an amount of about 1 to about 20% by weight based on 100% by weight of the siloxane-based polycarbonate.

6. The polycarbonate resin composition of claim 1, wherein the siloxane-based polycarbonate includes Si in an amount of about 0.3 to about 10% by weight based on 100% by weight of the siloxane-based polycarbonate.

7. The polycarbonate resin composition of claim 1, wherein the siloxane-based polycarbonate is prepared by reacting (B-1) one or more diphenyls and (B-2) bishydroxyarylsiloxane with (B-3) a carbonate precursor.

8. The polycarbonate resin composition of claim 7, wherein the diphenyls are compounds represented by the following Chemical Formula 3 or a combination thereof:

[Chemical Formula 3]

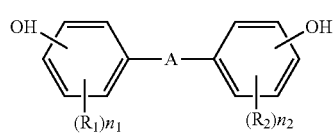

wherein in Chemical Formula 3,
- A is a single bond, substituted or unsubstituted linear or branched $C_1$ to $C_{30}$ alkylene, substituted or unsubstituted $C_2$ to $C_5$ alkenylene, substituted or unsubstituted $C_2$ to $C_5$ alkylidene, substituted or unsubstituted linear or branched $C_1$ to $C_{30}$ haloalkylene, substituted or unsubstituted $C_5$ to $C_6$ cycloalkylene, substituted or unsubstituted $C_5$ to $C_{10}$ cycloalkenylene, substituted or unsubstituted $C_5$ to $C_{10}$ cycloalkylidene, substituted or unsubstituted $C_6$ to $C_{30}$ arylene, substituted or unsubstituted linear or branched $C_1$ to $C_{20}$ alkoxylene, halogen acid ester group, carbonic acid ester group, CO, S, or $SO_2$;
- $R_1$ and $R_2$ are the same or different and are each independently substituted or unsubstituted $C_1$ to $C_{30}$ alkyl or substituted or unsubstituted $C_6$ to $C_{30}$ aryl; and
- n1 and n2 are the same or different and are each independently an integer from 0 to 4.

9. The polycarbonate resin composition of claim 7, wherein the bishydroxyarylsiloxane is a compound represented by the following Chemical Formula 4 or a combination thereof:

[Chemical Formula 4]

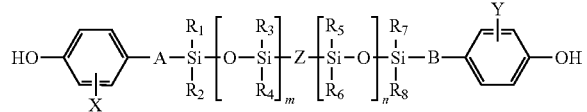

wherein in Chemical Formula 4,
- $R_1$ to $R_8$ are the same or different and are each independently $C_1$ to $C_{10}$ alkyl, $C_6$ to $C_{18}$ aryl, halogen or $C_1$ to $C_{10}$ alkoxy substituted $C_1$ to $C_{10}$ alkyl, or halogen or $C_1$ to $C_{10}$ alkoxy substituted $C_6$ to $C_{18}$ aryl;
- A and B are the same or different and are each independently $C_2$ to $C_{12}$ alkylene, $C_8$ to $C_{20}$ arylene, $C_2$ to $C_{12}$ alkylene including —O— or —S in the chain thereof, or $C_8$ to $C_{20}$ arylene including —O— or —S in the chain thereof;

X and Y are the same or different and are each independently hydrogen, halogen, $C_1$ to $C_{18}$ alkoxy, $C_1$ to $C_{10}$ alkyl, or $C_6$ to $C_{18}$ aryl;

Z is substituted or unsubstituted $C_1$ to $C_{18}$ alkylene, substituted or unsubstituted $C_6$ to $C_{18}$ cycloalkylene, or substituted or unsubstituted $C_6$ to $C_{18}$ arylene; and m and n are the same or different and are each independently an integer from 1 to 60, and n+m is an integer from 8 to 100.

10. The polycarbonate resin composition of claim 9, wherein the bishydroxyarylsiloxane is a compound of Chemical Formula 4-1, Chemical Formula 4-2, Chemical Formula 4-3, Chemical Formula 4-4, Chemical Formula 4-5, Chemical Formula 4-6, Chemical Formula 4-7, Chemical Formula 4-8, or a combination thereof:

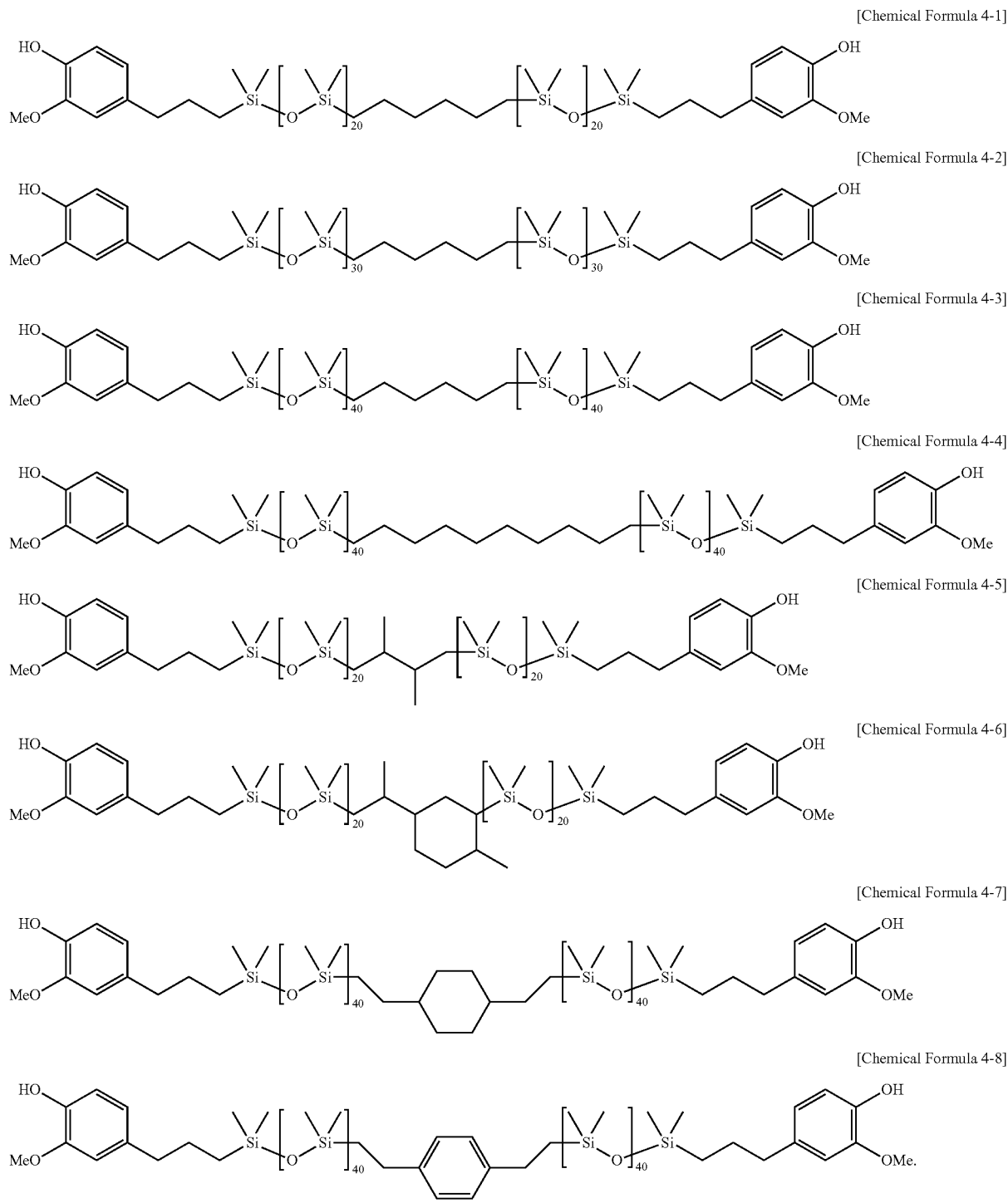

11. The polycarbonate resin composition of claim 9, wherein the compound represented by Chemical Formula 4 is prepared by (1) reacting a siloxane which is terminated with hydrogen represented by the following Chemical Formula 4A and a phenol derivative represented by the following Chemical Formula 4B to synthesize a monohydroxysiloxane represented by the following Chemical Formula 4C; and (2) reacting the monohydroxysiloxane and a diene to synthesize bishydroxyarylsiloxane:

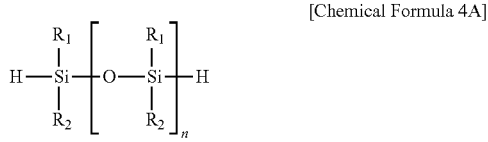

[Chemical Formula 4A]

wherein in Chemical Formula 4A, $R_1$ and $R_2$ are the same or different and each independently $C_1$ to $C_{10}$ alkyl, $C_6$ to $C_{18}$ aryl, halogen or $C_1$ to $C_{10}$ alkoxy substituted $C_1$ to $C_{10}$ alkyl, or halogen or $C_1$ to $C_{10}$ alkoxy substituted $C_6$ to $C_{18}$ aryl; and n is an integer from 4 to 100;

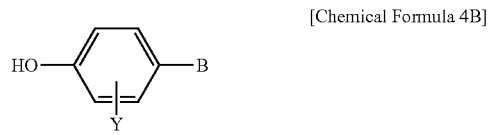

[Chemical Formula 4B]

wherein in Chemical Formula 4B, B is $C_2$ to $C_{12}$ alkylene having a double bond at its terminal, $C_8$ to $C_{20}$ arylene having a double bond at its terminal, $C_2$ to $C_{12}$ alkylene having a double bond at its terminal and including —O— or —S in the chain thereof, or $C_8$ to $C_{20}$ arylene having a double bond at its terminal and including —O— or —S in the chain thereof; and Y is hydrogen, halogen, $C_1$ to $C_{18}$ alkoxy, $C_1$ to $C_{10}$ alkyl, or $C_6$ to $C_{18}$ aryl;

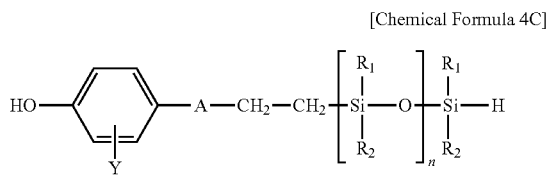

[Chemical Formula 4C]

wherein in Chemical Formula 4C, $R_1$ and $R_2$ are the same or different and are each independently $C_1$ to $C_{10}$ alkyl, $C_6$ to $C_{18}$ aryl, halogen or $C_1$ to $C_{10}$ alkoxy substituted $C_1$ to $C_{10}$ alkyl, or halogen or $C_1$ to $C_{10}$ alkoxy substituted $C_6$ to $C_{18}$ aryl; A is a single bond, $C_1$ to $C_{10}$ alkylene, $C_6$ to $C_{18}$ arylene, $C_1$ to $C_{10}$ alkylene including —O— or —S— in the chain thereof, $C_6$ to $C_{18}$ arylene including —O— or —S— in the chain thereof; Y is hydrogen, halogen, $C_1$ to $C_{18}$ alkoxy, $C_1$ to $C_{10}$ alkyl, or $C_6$ to $C_{18}$ aryl; and n is an integer from 4 to 100.

12. The polycarbonate resin composition of claim 1, wherein the siloxane-based polycarbonate has a weight average molecular weight (Mw) of about 10,000 to about 200,000 g/mol.

13. The polycarbonate resin composition claim 1, wherein the syndiotactic polystyrene has a syndiotactic degree of about 97 to about 100%.

14. The polycarbonate resin composition of claim 1, wherein the polycarbonate resin composition further comprises UV stabilizer, fluorescent brightening agent, lubricant, releasing agent, nucleating agent, antistatic agent, antioxidant, thermo-stabilizer, reinforcing material, inorganic additive, pigment, dye, or a combination thereof.

15. The polycarbonate resin composition of claim 1, having a notch Izod impact strength of about 45 to 60 kgf·cm/cm, wherein the notch impact strength is measured for a specimen having a thickness of 6.35 mm in accordance with ASTM D256.

16. The polycarbonate resin composition of claim 1, having a brittle fracture rate of about 0 to about 5%, wherein the brittle fracture rate is measured by preparing specimens with a size of 5 cm×20 cm×2 mm by injection molding, immersing the specimens into a thinner for two minutes, drying the specimens, placing a metal tip at gate portions of twenty specimens and dropping a 2kg load from a height of 70cm height to hit the gate portions, and measuring the brittle fracture rate based on the number of broken specimens.

17. The polycarbonate resin composition of claim 1, having a haze of about 1.0 to about 2.5%, wherein the haze is measured for a specimen having a thickness of 2 mm using a Haze meter YDP02-OD manufactured by Nippon Denshoku.

18. The polycarbonate resin composition of claim 1, having a transmittance of about 85 to about 90%, wherein the transmittance is measured for a specimen having a thickness of 2 mm using a Haze meter YDP02-OD manufactured by Nippon Denshoku.

* * * * *

UNITED STATES PATENT AND TRADEMARK OFFICE
CERTIFICATE OF CORRECTION

PATENT NO.         : 8,987,379 B2                                     Page 1 of 1
APPLICATION NO.    : 13/931952
DATED              : March 24, 2015
INVENTOR(S)        : Gi Ho Ahn et al.

It is certified that error appears in the above-identified patent and that said Letters Patent is hereby corrected as shown below:

In the Specification

Column 9, Line 33 reads: "(called as tisphenol-A'), 2,4-bis(4-hydroxyphenyl)-2-meth-"
and should read: "(called as `bisphenol-A'), 2,4-bis(4-hydroxyphenyl)-2-meth-"

Column 18, Line 55 reads: "1012 with 50% NaOH solution. After completing the stirring,"
and should read: "10~12 with 50% NaOH solution. After completing the stirring,"

In the Claims

Claim 9, Column 23, Line 5 reads: "dently hydrogen, halogen, $C_1$ to $C_{18}$ alkoxy, $C_1$ to $C_{10}$"
and should read: "dently hydrogen, halogen, $C_1$ to $C_{18}$ alkoxy, $C_1$ to $C_{10}$"

Claim 9, Column 23, Line 7 reads: "Z is substituted or unsubstituted $C_1$ to $C_{18}$ alkylene, substi-"
and should read: "Z is substituted or unsubstituted $C_1$ to $C_{18}$ alkylene, substi-"

Signed and Sealed this
Twentieth Day of October, 2015

Michelle K. Lee
*Director of the United States Patent and Trademark Office*